(12) United States Patent
Owen

(10) Patent No.: US 11,352,074 B2
(45) Date of Patent: Jun. 7, 2022

(54) SYSTEM AND APPARATUS FOR AERODYNAMIC PERFORMANCE IMPROVEMENTS TO A VEHICLE

(71) Applicant: David Owen, Toronto (CA)

(72) Inventor: David Owen, Toronto (CA)

(73) Assignee: David Owen, Toronto (CA)

( * ) Notice: Subject to any disclaimer, the term of this patent is extended or adjusted under 35 U.S.C. 154(b) by 440 days.

(21) Appl. No.: 16/702,971

(22) Filed: Dec. 4, 2019

(65) Prior Publication Data

US 2020/0180710 A1 Jun. 11, 2020

Related U.S. Application Data

(60) Provisional application No. 62/777,383, filed on Dec. 10, 2018.

(51) Int. Cl.
| | |
|---|---|
| *B62D 35/00* | (2006.01) |
| *B62D 65/16* | (2006.01) |
| *B62D 39/00* | (2006.01) |
| *B62D 37/02* | (2006.01) |

(52) U.S. Cl.
CPC ......... *B62D 35/001* (2013.01); *B62D 35/007* (2013.01); *B62D 37/02* (2013.01); *B62D 39/00* (2013.01); *B62D 65/16* (2013.01)

(58) Field of Classification Search
CPC .... B62D 35/001; B62D 35/007; B62D 37/02; B62D 39/00; B62D 65/16
See application file for complete search history.

(56) References Cited

U.S. PATENT DOCUMENTS

| | | | |
|---|---|---|---|
| 8,025,329 B1* | 9/2011 | Kron ................... | B62D 35/001 |
| | | | 296/180.1 |
| 9,650,086 B1* | 5/2017 | Pfaff .................... | B62D 35/001 |
| 10,589,800 B1* | 3/2020 | Calaway .............. | B62D 35/008 |
| 2007/0001481 A1* | 1/2007 | Breidenbach ........ | B62D 35/001 |
| | | | 296/180.1 |
| 2007/0046066 A1* | 3/2007 | Cosgrove ............. | B62D 35/001 |
| | | | 296/180.4 |
| 2008/0116716 A1* | 5/2008 | O'Grady .............. | B62D 35/001 |
| | | | 296/180.4 |
| 2008/0157560 A1* | 7/2008 | Spector ................... | B60J 5/108 |
| | | | 296/180.4 |
| 2009/0096250 A1* | 4/2009 | Kohls .................. | B62D 35/001 |
| | | | 29/700 |

(Continued)

*Primary Examiner* — Lori L Lyjak
(74) *Attorney, Agent, or Firm* — Kusner & Jaffe

(57) ABSTRACT

Systems and methods for diverting airflow around a vehicle during forward motion are disclosed, having at least one inlet orifice, at least one duct, the at least one duct in fluid communication with the at least one inlet orifice, at least one outlet orifice, and a tailcone assembly having a rearwardly facing, convexly projecting rounded surface, the tailcone assembly abutting the rear surface of the vehicle, the outlet located on the rearwardly facing, convexly projecting rounded surface, the tailcone assembly defining an internal cavity, the at least one internal cavity in fluid communication with the at least one outlet orifice and the at least one duct. Further improvements adapted to encourage laminar flow about a land vehicle when in motion are also disclosed.

30 Claims, 13 Drawing Sheets

(56) References Cited

U.S. PATENT DOCUMENTS

2011/0221231 A1\* 9/2011 Visser ................. B62D 35/004
 296/180.4
2012/0261945 A1\* 10/2012 Litchfield ............ B62D 35/001
 296/180.1

\* cited by examiner

SYSTEM AND APPARATUS FOR AERODYNAMIC PERFORMANCE IMPROVEMENTS TO A VEHICLE

FIELD

The present invention relates to the aerodynamic performance of land vehicles. More specifically, the present invention relates to aerodynamic improvements to land vehicles that are contemplated to reduce the air pressure differential between the high pressure at the front of the vehicle and the lower pressure at the rear of the vehicle in order to improve laminar air flow around the vehicle when in motion. Further improvements adapted to encourage laminar air flow about a land vehicle when in motion are also disclosed.

BACKGROUND

When in motion, a vehicle experiences significant frictional losses due to air resistance given that the vehicle is moving through a viscous fluid (i.e.: atmospheric air). These frictional losses can be collectively termed parasitic drag and are largely dependent on the cross-sectional shape and area of the vehicle (i.e. the form factor) and the "surface roughness" of the vehicle.

A vehicle having a high drag coefficient has an aerodynamically inefficient form factor which encourages turbulent flow (rather than laminar flow) about the vehicle. This turbulent flow can further result in a pressure differential between the front of vehicle and the rear of the vehicle. As such, streamlined vehicles having low drag coefficients, smooth surfaces and airflow with reduced turbulence experience lower kinetic energy losses due to the overall reduction of these parasitic drag factors.

The energy efficiency of a vehicle is directly linked to its aerodynamic performance and in fact it is well known that resistive forces incurred by parasitic drag are proportionally related to the velocity of the vehicle. As such, it is desirable to improve a vehicle's form factor and surface roughness in to order to reduce these resistive losses in the interest of improving overall energy efficiency of the vehicle.

As fossil fuels become scarce and combustion by-products are taxed in certain jurisdictions to reduce the impacts of hydrocarbon pollution, energy efficiency is of increasing importance in the world of mass transport and logistics. Moreover, it will be appreciated that electricity has been increasingly adopted as an energy source for land vehicles. Given the technical limitation on battery capacity, it will be readily appreciated that energy efficiency is also a primary consideration in the design of electric and hybrid-fuel vehicles Moreover, it would be beneficial to provide systems and apparatuses that can be used in connection with existing vehicles in order to improve the aerodynamic performance of these vehicles through relatively affordable, aftermarket modifications. It would be further beneficial if these apparatuses and systems could be installed or incorporated into existing vehicles without requiring any appreciable alteration of the height, width or storage capacity of the vehicle, particularly in the case of cargo trailers.

Accordingly, there is a need for systems and apparatuses contemplated to reduce the air pressure differential between the high pressure at the front of the vehicle and the lower pressure at the rear of the vehicle in order to improve laminar flow around the vehicle when in motion.

BRIEF SUMMARY

The present invention provides systems and apparatuses contemplated to reduce the air pressure differential between the high pressure at the front of the vehicle and the lower pressure at the rear of the vehicle in order to improve laminar flow around the vehicle when in motion. It is further contemplated that the present invention can be incorporated into standard vehicles as aftermarket improvements or in other embodiments the present invention can be incorporated into new vehicles.

In at least one embodiment, the present invention provides a system for diverting airflow around a vehicle during forward motion having at least one inlet orifice, the at least one inlet orifice located on at least one of a front surface, a side surface, a lower surface or a top surface of the vehicle, at least one duct, the at least one duct in fluid communication with the at least one inlet orifice, the at least one duct oriented substantially parallel to a longitudinal axis of the vehicle, at least one outlet orifice, and a tailcone assembly having a rearwardly facing, convexly projecting rounded surface, the tailcone assembly abutting a rear surface of the vehicle, the outlet orifice located on the rearwardly facing, convexly projecting rounded surface, the tailcone assembly defining an internal cavity, the at least one internal cavity in fluid communication with the at least one outlet orifice and the at least one duct.

In another embodiment, the present invention provides a trailer having at least one inlet orifice, the at least one inlet orifice located on at least one of a front surface, a side surface, a lower surface or a top surface of the trailer, at least one duct, the at least one duct in fluid communication with the at least one inlet orifice, the at least one duct oriented substantially parallel to a longitudinal axis of the trailer, at least one outlet orifice, and a tailcone assembly having a rearwardly facing, convexly projecting rounded surface, the tailcone assembly abutting a rear surface of the trailer, the outlet orifice located on the rearwardly facing, convexly projecting rounded surface, the tailcone assembly defining an internal cavity, the at least one internal cavity in fluid communication with the at least one outlet orifice and the at least one duct.

DESCRIPTION OF THE DRAWINGS

The present invention will be better understood in connection with the following Figures, in which.

DETAILED DESCRIPTION OF THE EMBODIMENTS

Figure 1:
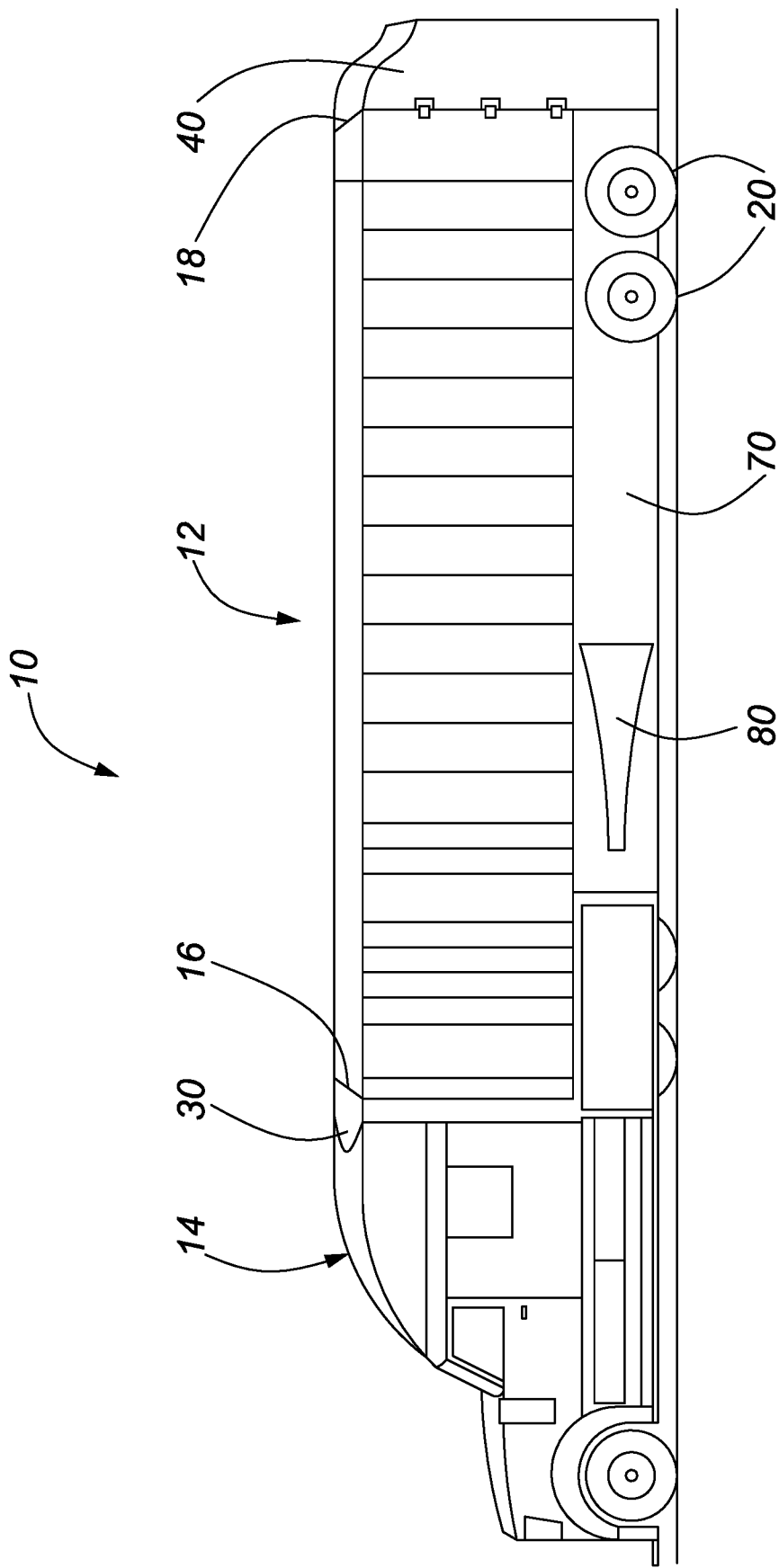
FIG. 1 is a side elevation view of a vehicle having a system of aerodynamic improvements in accordance with this present invention.

The present invention provides systems and apparatuses contemplated to reduce the air pressure differential between the high pressure at the front of the vehicle and the lower pressure at the rear of the vehicle in order to improve laminar flow around the vehicle when in motion. It is further contemplated that the present invention can be incorporated into standard vehicles as aftermarket improvements or in other embodiments the present invention can be incorporated into new vehicles.

It will be readily appreciated that the components of the present invention can be manufactured out of any suitable materials and to any suitable dimensions as required by the end user application of the present invention. Similarly, it is contemplated that the components of the present invention can be manufactured by way of any suitable manufacturing techniques.

In at least one embodiment, it is contemplated that the present invention discloses systems and apparatuses for diverting airflow around a vehicle during forward motion having at least one inlet orifice in fluid communication with at least one duct which is in further fluid communication with at least one outlet orifice positioned in a tailcone assembly that abuts a rear surface of the vehicle.

It is contemplated that a suitable vehicle can include, but is not limited to, a bus, small or large car, light or heavy-duty truck, container van, sport-utility or off-road vehicle, train car or towed trailer.

In at least one embodiment it is contemplated that the present invention is contemplated for use in connection with a tractor-trailer combination, as will be discussed in further detail below.

It is contemplated that an inlet orifice for use in connection with the present invention can take a wide variety of suitable forms and cross-sectional shapes as required by the end user application of the present invention. It is contemplated that any number of inlet orifices can be employed by the present invention and that these inlet orifices can be located at any suitable external position on the vehicle, as will be understood by the skilled person. In some embodiment, it is contemplated that the inlet orifice can further include louvres, airfoils or vanes to assist with the redirection of inlet flow into the inlet orifice. In some embodiments, it is contemplated that the inlet orifice can further include a screen in order to prevent debris from entering the inlet orifice. In at least one embodiment it is contemplated that the inlet orifice is a NACA inlet, as will be readily understood by the skilled person.

In at least one embodiment it is contemplated that the at least one inlet orifice is located on the front surface of a trailer that mates with a tractor. In these embodiments, it is contemplated that the tractor can also have a front inlet orifice, a central main duct and a rear outlet orifice such that the rear outlet orifice fluidly communicates with the corresponding inlet orifice of the trailer. In this way, it is contemplated that air can be ducted from the front of the tractor to the rear of the trailer in order to alleviate the pressure differential between the high pressure at the front of the vehicle and the lower pressure at the rear of the vehicle.

It is contemplated that a duct for use in connection with the present invention can take a wide variety of suitable forms and cross-sectional shapes as required by the end user application of the present invention. It is contemplated that any number of ducts can be employed by the present invention and the orientation and number of ducts will depend in part on the number of inlet orifices, as will be understood by the skilled person. In some embodiments, it is contemplated that multiple inlet orifices will fluidly communicate with one or more ducts in a shared arrangement and in other embodiments it is contemplated that each inlet orifice is in fluid communication with a dedicated duct, as will be discussed in further detail herein. In some embodiment, it is contemplated that a suitable duct is in fact two longitudinal ducts that do not fluidly communicate with one another as they are separated from one another along a longitudinal axis, as will be discussed in further detail herein.

It is further contemplated that a duct in accordance with the present invention may be located in number of orientations depending on the overall shape of the vehicle and the number of inlet orifices present. In some embodiments, it is contemplated that the vehicle is a trailer having a floor and the duct is positioned beneath the floor abutting the lower surface of the trailer along the longitudinally extending axis of the trailer. In some embodiments, it is contemplated that the duct further includes a convergence section that has at least a first branch that fluidly communicates with a first inlet orifice and at least a second branch that fluidly communicates with a second inlet orifice, as will be discussed in further detail below.

It is contemplated that an outlet orifice for use in connection with the present invention can take a wide variety of suitable forms and cross-sectional shapes as required by the end user application of the present invention. As will be appreciated by the skilled person, it is contemplated that the cross-sectional shape and size of the outlet orifice can be selected depending on the desired optimized results that the practitioner of the present invention wishes to achieve. In some embodiments, it is contemplated that the cross-sectional size and shape of the outlet orifice may be selected to create a divergent or convergent nozzle effect at the point where the outlet orifice meets the ambient environment in order to achieve the desired flow-rate characteristics at this position, as will be readily appreciated by the skilled person.

It is contemplated that a suitable vehicle for use in connection with the present invention has a rear surface which abuts a rearwardly facing tailcone. As will be discussed further herein, it is contemplated that the tailcone can be an integral part of the rear surface of the vehicle or in other embodiments can be a separate component that is suitably mounted to the vehicle so that it abuts the rear surface of the vehicle. It is contemplated that the tailcone convexly projects away from the vehicle in a rearward manner and it will be readily appreciated by the skilled person that the exact aerodynamic shape and profile of the tailcone can be selected based on the resulting optimal flow profile that the practitioner of the present invention wishes to achieve.

It is contemplated that the tailcone assembly can be manufactured out of an impact absorbing material such as but not limited to butyl rubber, styrofoam, neoprene rubber, polyurethane foam or open cell foam. In other embodiments it is contemplated that the tailcone assembly is manufactured out of a flexible material that can be inflated with air or another gas in order to achieve the desired shape. In some embodiments it is contemplated that the tailcone assembly is a single unitary component that is suitably secured to the rear surface of the vehicle and in other embodiments it is contemplated that the tailcone assembly is comprised of multiple components that are each suitably secured to the rear surface of the vehicle, as will be discussed in further detail herein.

It is contemplated that the outlet orifice is located on an external, rearward surface of the tailcone assembly. As will be readily appreciated by the skilled person, the exact location of the outlet orifice will depend on a number of factors, including: the cross-sectional shape and size of the outlet orifice, the external shape and size of the tailcone assembly, the number of outlet orifices being used, and the resulting optimal flow profile that the practitioner of the present invention wishes to achieve.

In some embodiments it is contemplated that the tailcone assembly includes an internal cavity that is in fluid communication with the outlet orifice and the duct. In other embodiments it is contemplated that the duct extends through the tailcone assembly and fluidly communicates directly with the outlet orifice. In embodiments where an internal cavity is present, it is further contemplated that this internal cavity may further include louvres or vanes to assist with directing fluid flow with the internal cavity to the outlet orifice, as will be discussed in further detail herein.

In some embodiments, it is contemplated that the tailcone assembly is mounted to a perimeter edge of the rear surface of the vehicle. In some embodiments, it is contemplated that the tailcone assembly is mounted to the rear surface of the vehicle by way of a hinge mechanism, such that the tailcone assembly can be moved from a first position where it abuts the rear surface of the vehicle to a second position where the tailcone assembly is moved away from the rear surface of the vehicle. In some embodiments it is further contemplated that latching means are provided that assist with securing the tailcone assembly in the first position. It is contemplated that the outer surface of the tailcone assembly can take any suitable external shape in order to maximize the aerodynamice performance of the tailcone assembly including generally planar and prismatic or curved and smoothly adjoining, as will be readily appreciated by the skilled person.

In these embodiments it is contemplated that the rear surface of the vehicle may include an access door or multiple access doors that can be opened when the tailcone assembly is moved to the second position, as will be discussed in further detail herein.

In some embodiments, it is contemplated that the vehicle is a trailer for towing behind a tractor truck, such as but not limited a standard semi-trailer. In these embodiments, it is contemplated that the trailer can have a number of additional features to encourage laminar flow about the trailer when in forward motion.

In some embodiments, it is contemplated that trailer has a lower surface that extends longitudinally from a position that is at least adjacent to the front end of the trailer to a position that is adjacent to the rear end of the trailer and which extends laterally between a first longitudinal side edge and a second longitudinal side edge. In some embodiments, it is contemplated that the opposing, upper surface of the lower surface operates as the floor of the trailer.

In some embodiments, the trailer further includes a first side skirt wall that projects downwardly from the first longitudinal side edge of the lower surface of the trailer and a second side skirt wall that projects downwardly from the second longitudinal side edge of the lower surface of the trailer. It is contemplated that the side skirts can extend from a position longitudinally and rearwardly removed from the front end of the trailer to the rear end of the trailer, or from a position approximately adjacent the front end of the trailer to a position approximately adjacent the rear end of the trailer, among any other arrangements as required by the particular end user application of the present invention.

In some embodiments, it is contemplated that at least one wheelset is mounted to the lower surface of the trailer. In some embodiments, it is contemplated that the wheelset is positioned between the downwardly projecting side skirt walls. In other embodiments, it is contemplated that semi-circular cutouts are provided in the side skirt walls to accommodate wheels for supporting the trailer in an otherwise enclosed manner.

In some embodiments, it is contemplated that the duct is positioned adjacent the lower surface of the trailer. In some embodiments, it is contemplated that the duct is positioned between the side skirt walls. Moreover, in some embodiments as discussed herein, the at least one inlet orifice is two inlet orifices and a first inlet orifice is positioned in the first side skirt wall and a second inlet orifice is positioned in the second side skirt wall. In these embodiments, it is contemplated that the main duct may include a convergence section and a rear central duct portion where a first branch of the convergence section fluidly communicates with one inlet orifice and a second branch of the convergence section fluidly communicates with the second inlet orifice, and where the convergence section fluidly communicates with a rear central duct portion.

In other embodiments, it is contemplated that the main duct may in fact be comprised of a first longitudinal duct that is isolated from a second longitudinal duct such that these two ducts do not fluidly communicate with one another. In these embodiments, it is contemplated that the first inlet orifice fluidly communicates with the first longitudinal duct and the second inlet orifice fluidly communicates with the second inlet duct such that fluid flow in the first longitudinal duct does not mix or interfere with fluid flow with the second longitudinal duct. In these embodiments, it is contemplated that the first longitudinal duct and the second longitudinal duct each have outlets that separately fluidly communicate with the tailcone assembly, as discussed herein.

In some embodiments, it is contemplated that a longitudinally extending floorpan is provided that longitudinally extends from a position that is longitudinally and rearwardly removed from the front end of the trailer to a position that is adjacent to the rear end of the trailer and which substantially extends laterally between at least a portion of a lower edge of the first side skirt wall and at least a portion of a lower edge of the second side skirt wall. In this way it is contemplated that the floorpan encloses the bottom surface of the trailer between the side skirt walls in order to encourage laminar flow about the lower surfaces of the trailer. In some embodiment, it is also contemplated that the longitudinally extending floorpan encloses the main duct. In these embodiments, it is contemplated that the main duct, optional convergence section, front and rear central duct portions and optional wheelset can be substantially enclosed by the floorpan. In some embodiments, it is contemplated that the at least one inlet orifice is located in the longitudinally extending floorpan.

In some embodiments, it is contemplated that the front edge of the floorpan and/or the lower front surface of the trailer is curved in order to permit articulation of the tractor relative to a tractor. It is further contemplated that a rear lower surface of the tractor may be similarly and correspondingly curved to accommodate the trailer in a manner that permits articulation of the tractor trailer combination.

In some embodiments, the trailer has a front surface which includes forwardly projecting gap-filling means that are adapted to fill the air gap that is presented between the front surface of the trailer and an opposing rear surface of a towing vehicle, a common arrangement that is present on a standard semi-tractor trailer combination as will be understood by the skilled person. It is contemplated that the forwardly projecting gap-filling means can take a variety of forms.

In some embodiments, the gap filling means are an inflatable bladder having a generally arcuate front surface such that the inflatable bladder can be inflated by a variety of means and will therefore abut the rear surface of the towing vehicle when inflated in a manner that eliminates the air gap but permits articulation of the towing vehicle relative to the trailer.

In other embodiments, the gap-filling means are a retractable yet forwardly-extending flexible housing that can extend forward to abut the rear surface of the towing vehicle in order to eliminate the air gap but permits articulation of the towing vehicle relative to the trailer.

In other embodiments, the gap filling means are a forwardly projecting, flexible but resilient foam pad having a generally arcuate front surface such that the foam pad will therefore abut the rear surface of the towing vehicle in a manner that eliminates the air gap but permits articulation of the towing vehicle relative to the trailer.

Turning to FIGS. 1 to 8 at least one embodiment of a vehicle in accordance with the present invention is illustrated. In this embodiment, vehicle 10 is a trailer 12 being towed by a tractor 14. Trailer 12 includes a pair of wheel sets 20, a gap-filling assembly 30 mounted to a front surface 16 of trailer 12, a tailcone assembly 40 abutting a rear surface 18 of trailer 12, and a downwardly projecting side skirt 70 that further includes an inlet orifice 80.

Figure 2:
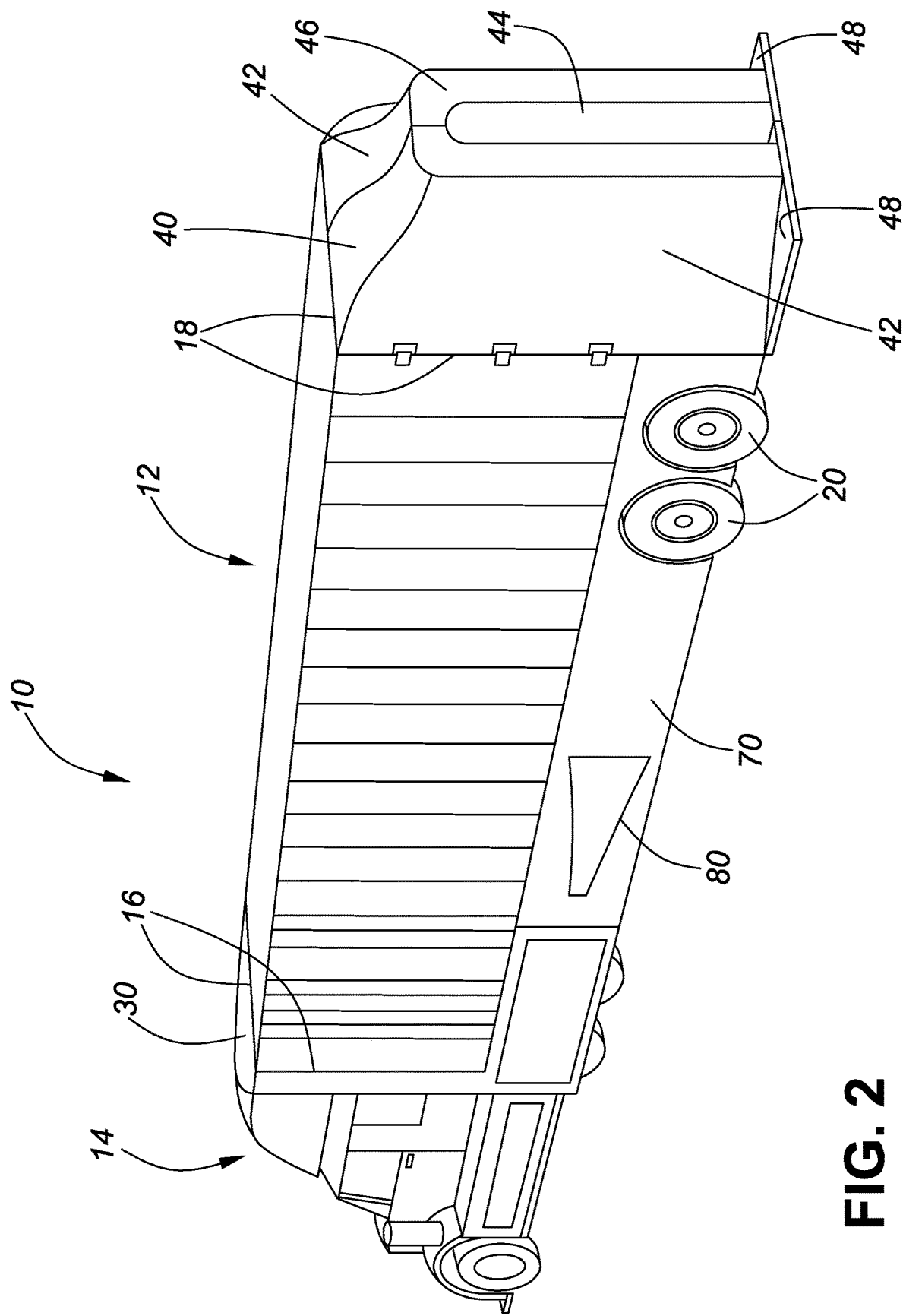
FIG. 2 is a rear perspective view of the vehicle of FIG. 1.
Figure 3:
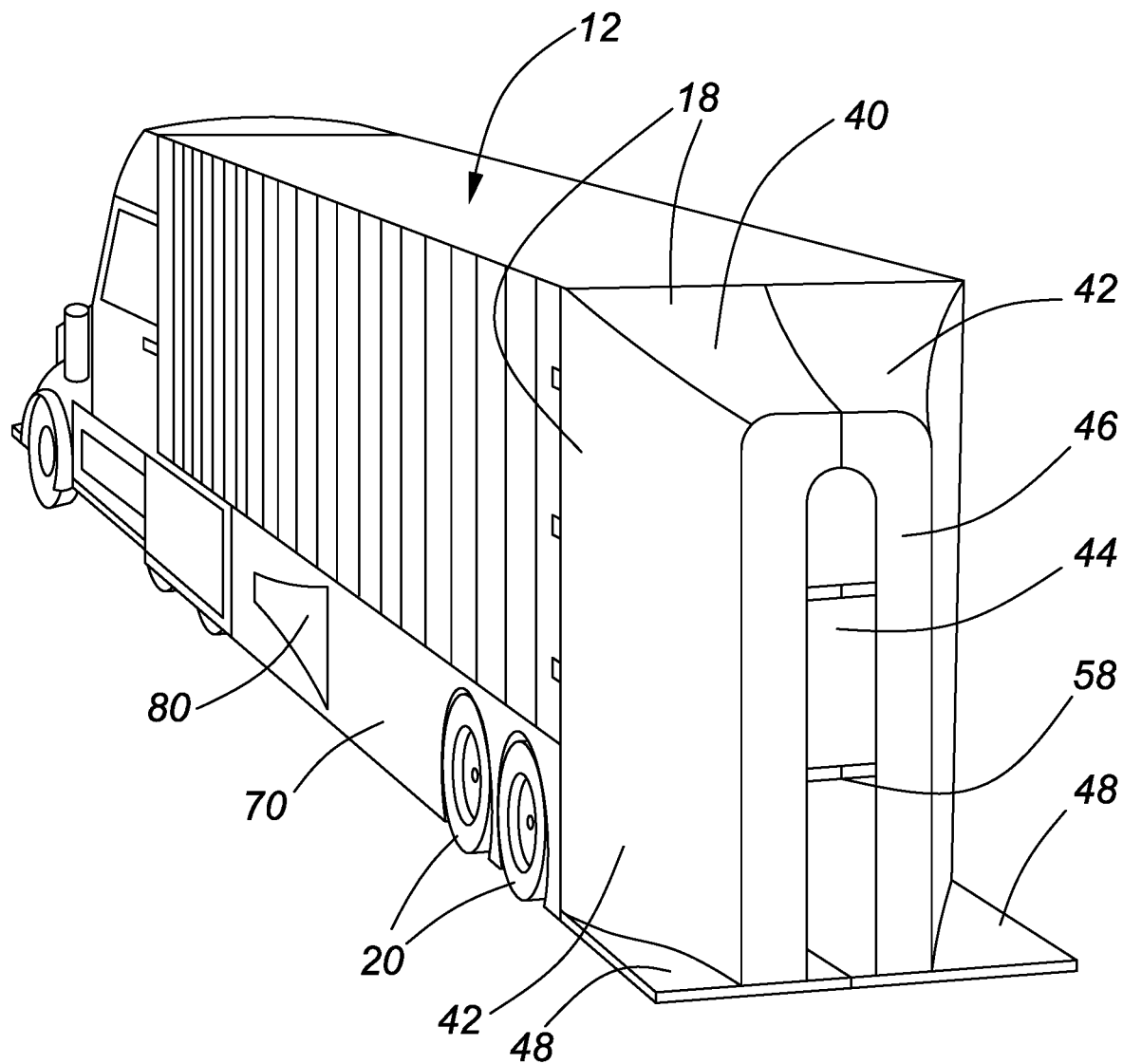
FIG. 3 is another rear perspective view of the vehicle of FIG. 1.

With reference to FIGS. 2 and 3, it can be seen that tailcone assembly 40 further includes a rearwardly projecting, convex surface 42, an outlet orifice 44, an optional flat perimeter rim 46, and an optional lower plate 48. In this embodiment outlet orifice 44 is a vertically extending slot with a curved upper end and a flat lower end, however other embodiments are also contemplated as discussed herein. In this embodiment, it is also contemplated that tailcone assembly 40 further includes internal flow directing vanes 58, as can be seen in FIG. 3 and as will be discussed in further detail herein. Lower plate 48 is provided to create a smooth lower aerodynamic surface beneath tailcone assembly 40 when the vehicle is in motion.

Figure 4:
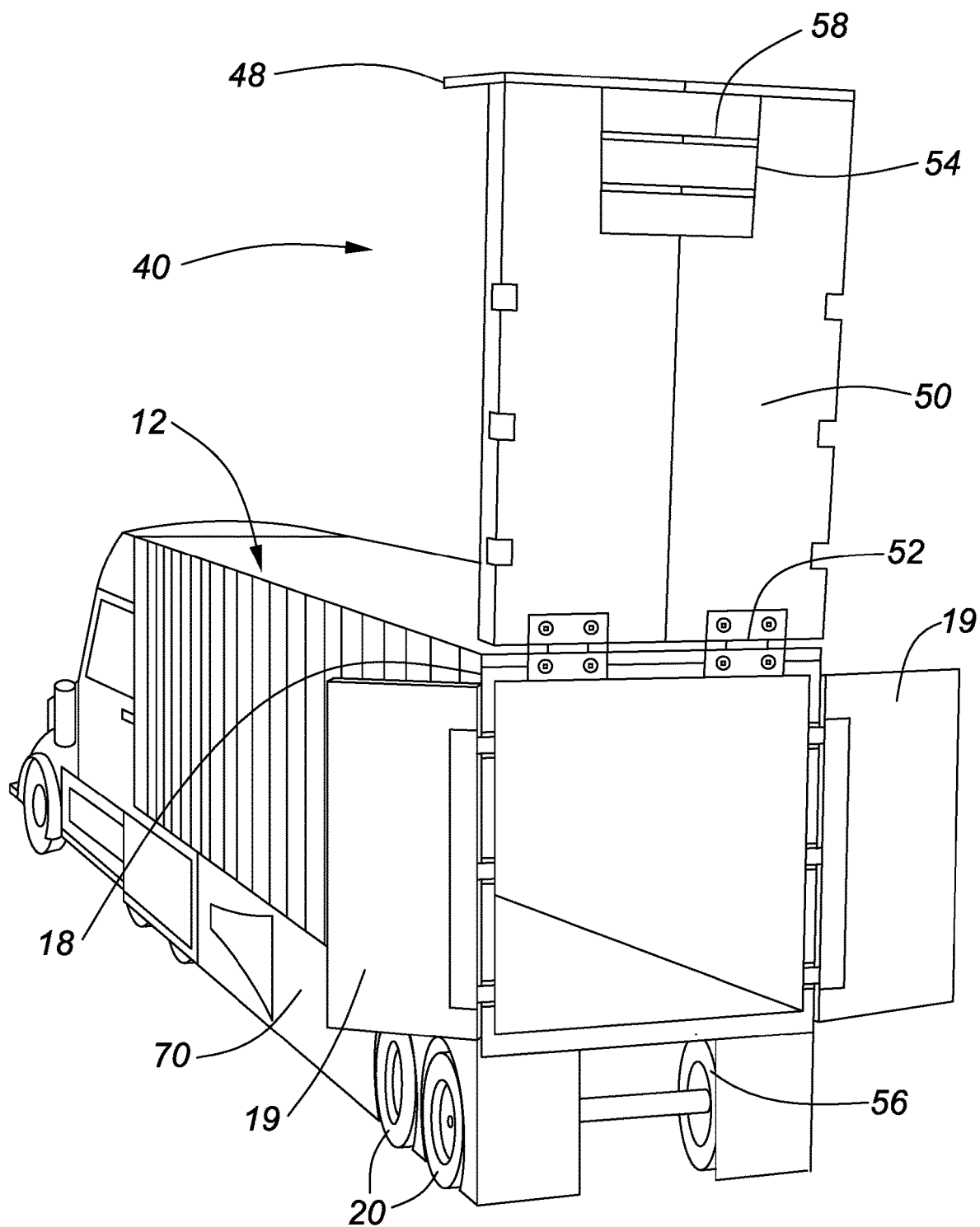
FIG. 4 is another rear perspective view of the vehicle of FIG. 1 where the tailcone is in an opened position.

Turning to FIG. 4, in this embodiment it is contemplated that tailcone assembly 40 has a forwardly facing front surface 50 and is mounted to an edge of rear surface 18 of trailer 12 by way of hinge means 52. It is contemplated that rear surface 18 trailer 12 further includes doors 19. In this embodiment, it is further contemplated that tailcone assembly 40 further includes a tailcone inlet orifice 54 that fluidly communicates with an optional outlet 56 of the main duct (not shown). Moreover, tailcone assembly 40 defines an internal cavity that includes internal flow directing vanes 58, as will be discussed in further detail herein. In this way, it is contemplated that tailcone assembly 40 can be moved to a second position as seen in FIG. 4 in order to provide access to doors 19 of trailer 12.

Figure 5:
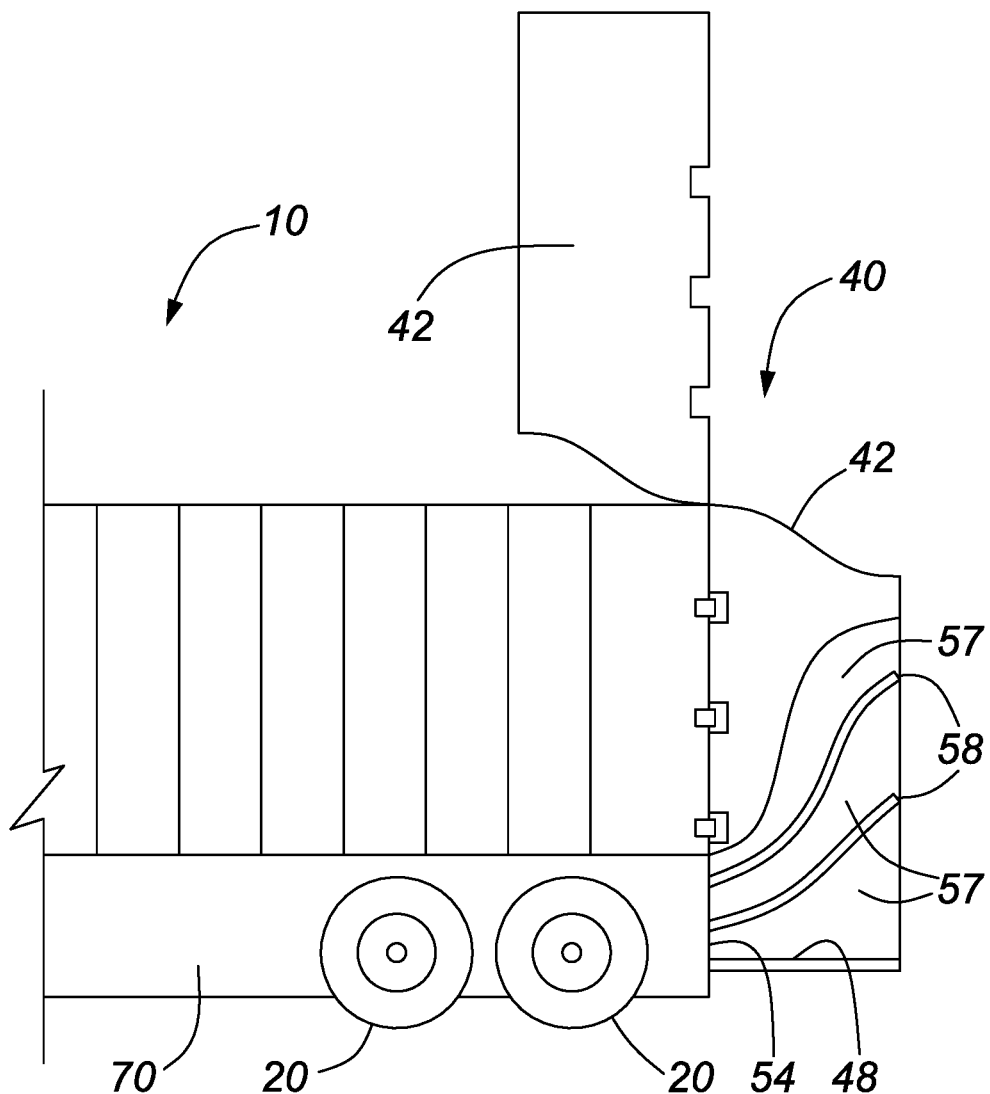
FIG. 5 is a side elevation view of the vehicle of FIG. 1 where the tailcone is in an opened position.
Figure 6:
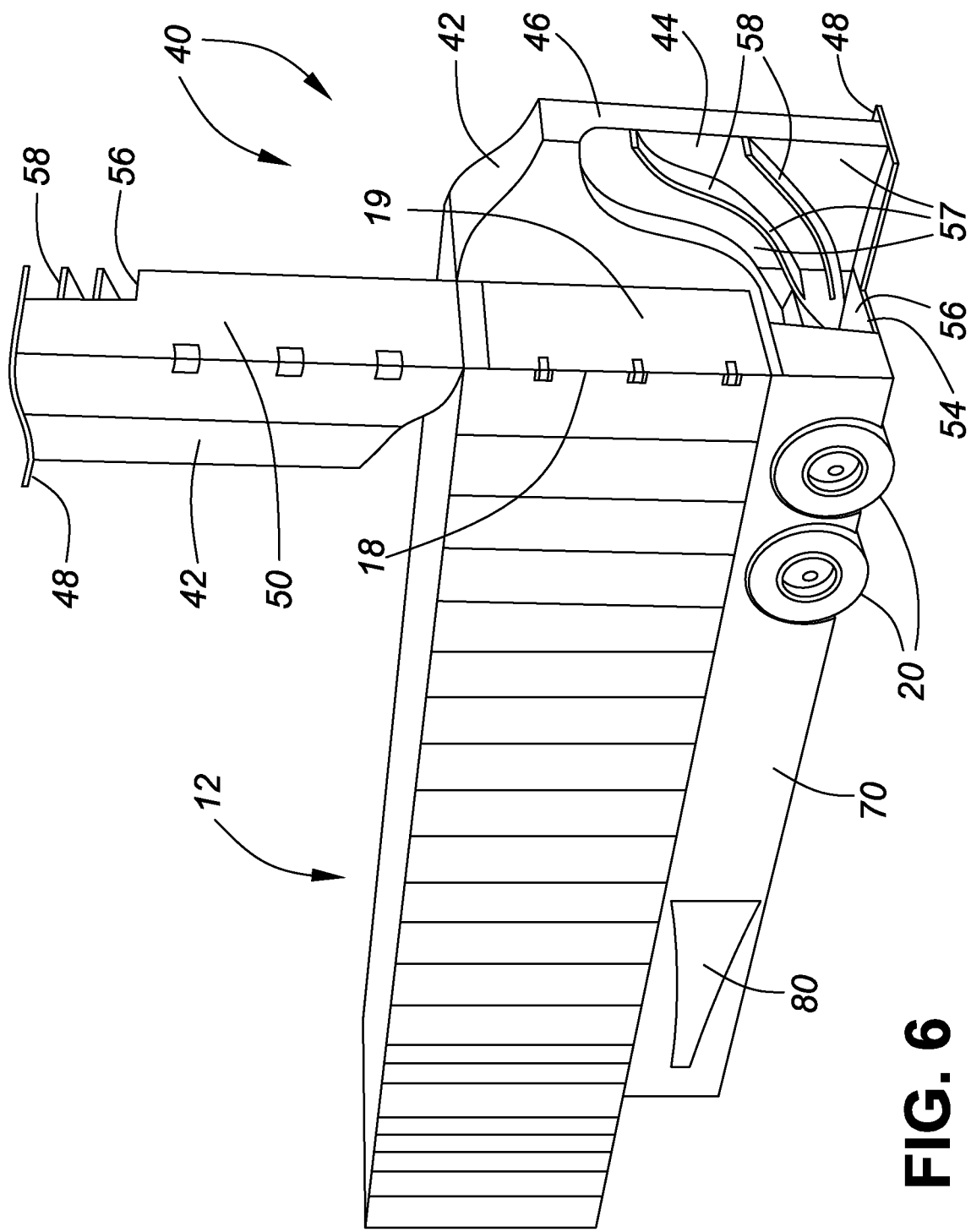
FIG. 6 is another rear perspective view of another embodiment of a vehicle in accordance with the present invention where the tailcone is in a partially opened position.

Turning to FIGS. 5 and 6, in this embodiment tailcone assembly 40 is a two-part assembly. Moreover, tailcone assembly 40 includes a tailcone inlet orifice 54 and defines an internal cavity 57 that is divided into separate flow channels by internal flow directing vanes 58. Internal cavity 57 in turn fluidly communicates with outlet orifice 44.

Figure 7:
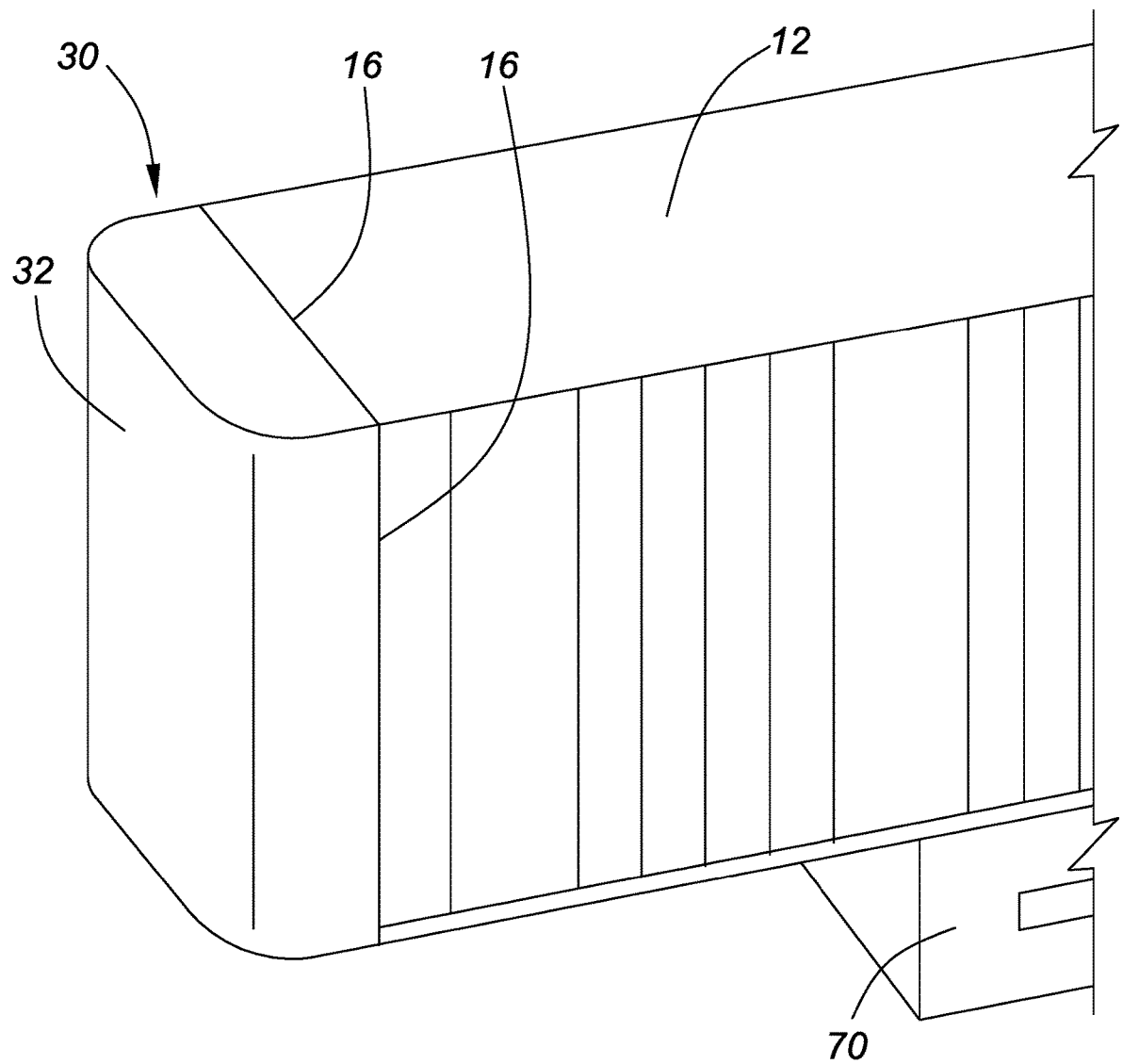
FIG. 7 is a front perspective view of a trailer for use in connection with the vehicle of FIG. 1.
Figure 8:
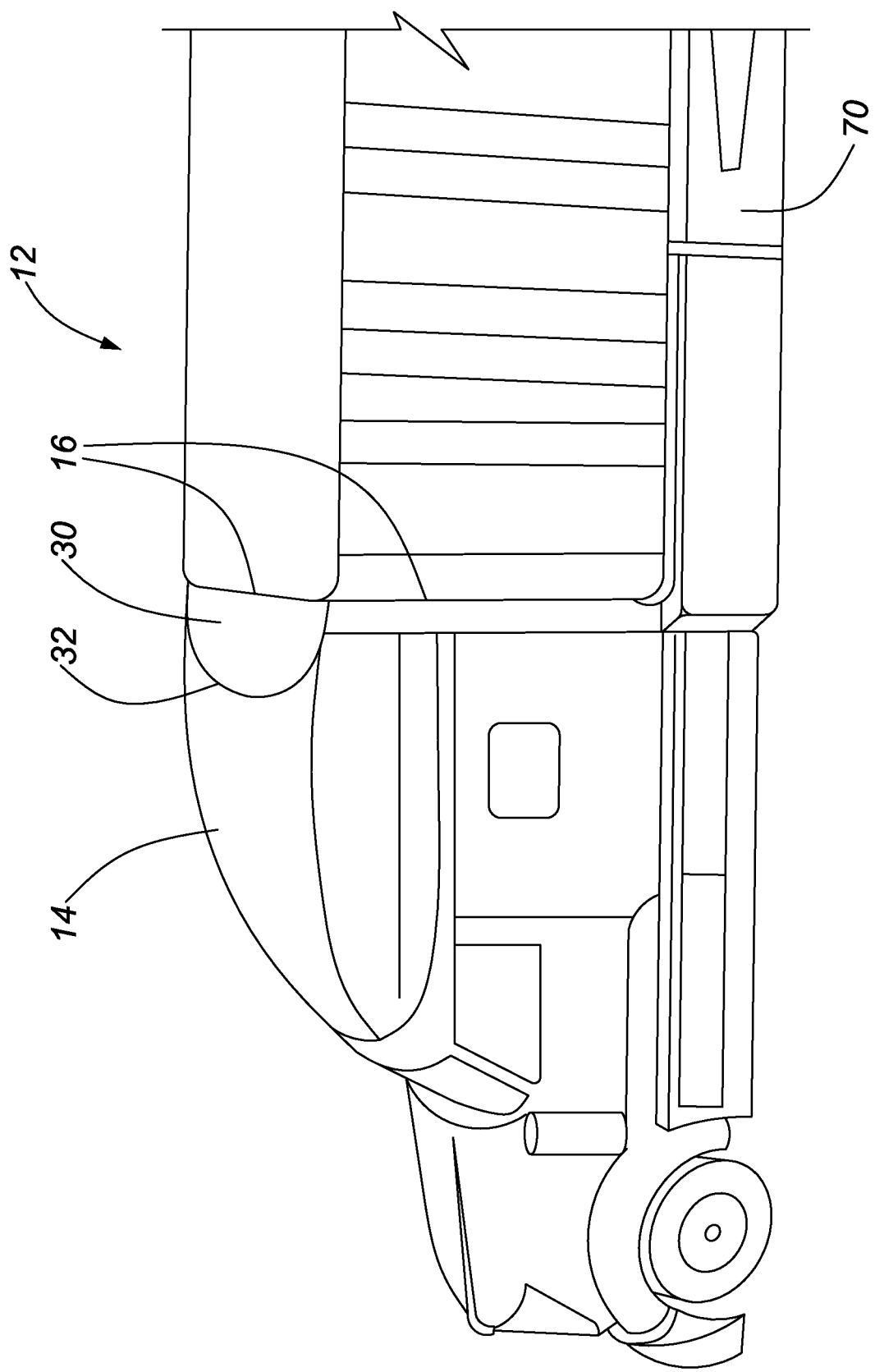
FIG. 8 is an upper perspective view of the vehicle of FIG. 1.

Turning to FIGS. 7 and 8, in this embodiment trailer 12 has a gap-filling assembly 30 mounted to a front surface 16 of trailer 12. In this embodiment gap-filling assembly 30 has a convex, arcuately shaped front surface 32 that is constructed of flexible yet resilient foam material and as such that gap-filling assembly 30 eliminates the air gap between the rear of the tractor 14 and the front surface 16 of trailer 12 but permits smooth articulation of tractor 14 relative to trailer 12. As discussed herein, other arrangements are also contemplated for gap-filling means.

Figure 9:
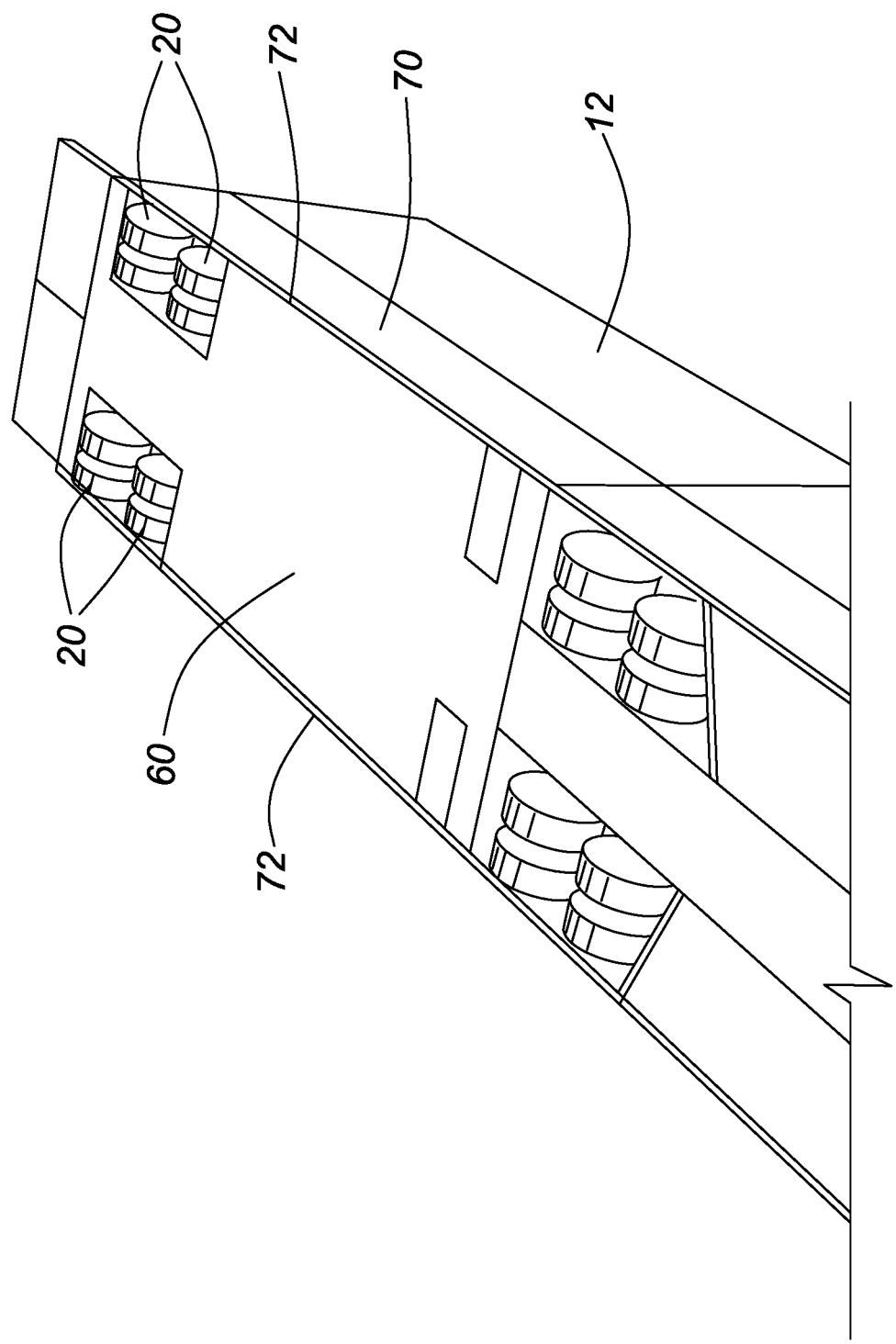
FIG. 9 is a lower front perspective of the lower surface of the vehicle of FIG. 1.

Turning to FIG. 9, a lower view of trailer 12 is illustrated. In this embodiment, a longitudinally extending floorpan 60 is provided that extends from a position that longitudinally and rearwardly removed from the front end of the trailer 12 to a position that is adjacent to the rear end of the trailer 12 and which substantially extends laterally between at least a portion of a lower edge 72 of the first side skirt wall 70 and at least a portion of a lower edge 72 of a second side skirt wall (not shown). In this way it is contemplated that floorpan 60 substantially encloses the bottom surface of trailer 12 in order to encourage laminar flow about the lower surfaces of the trailer 12.

In these embodiments, it is contemplated that a main duct (not shown), optional convergence section (not shown), and optional wheelset 20 can be substantially enclosed by floorpan 60 as will be discussed in further detail below.

Figure 10:
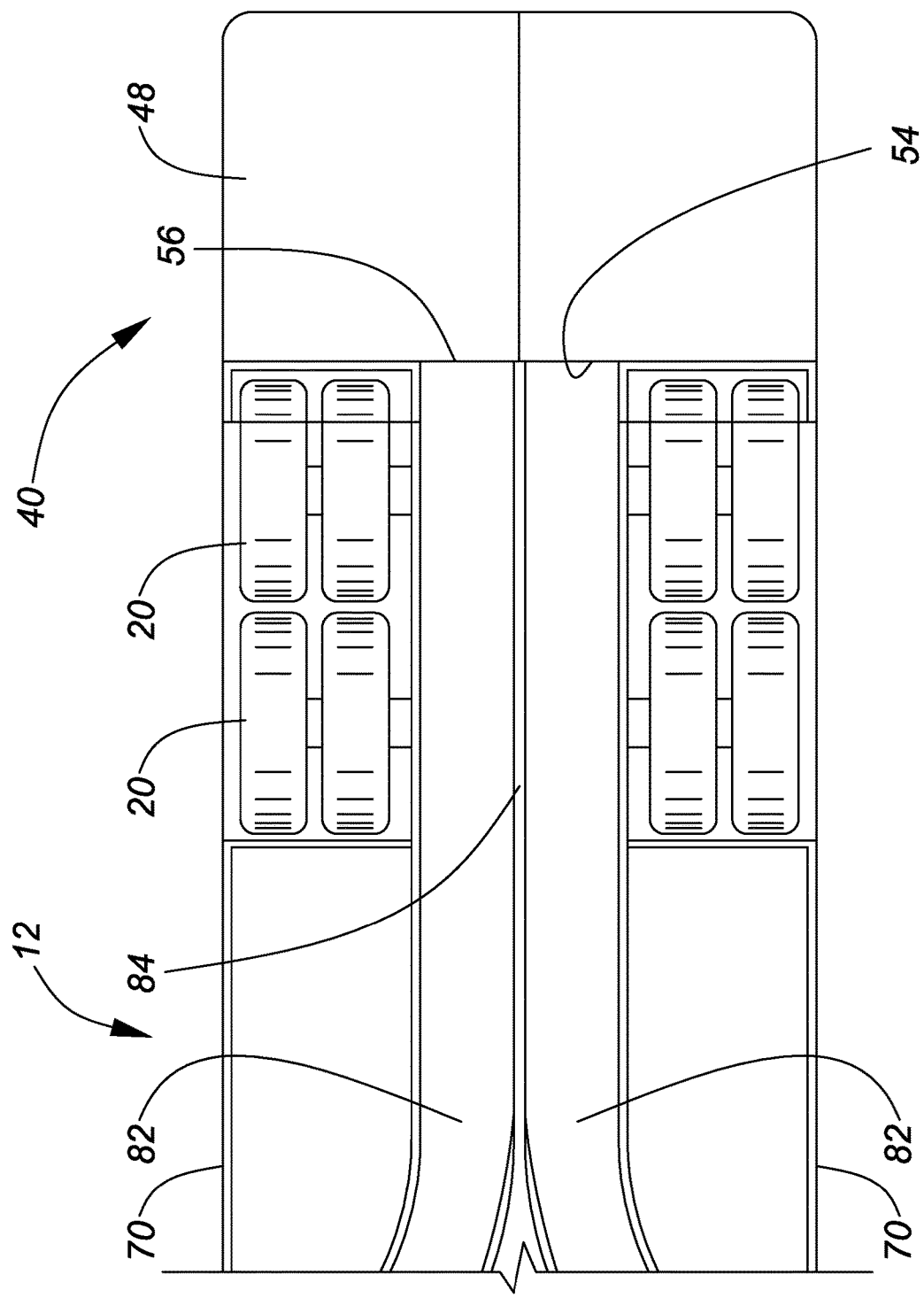
FIG. 10 is a bottom view of the lower surface of the vehicle of FIG. 1 wherein the floorpan has been removed.
Figure 11:
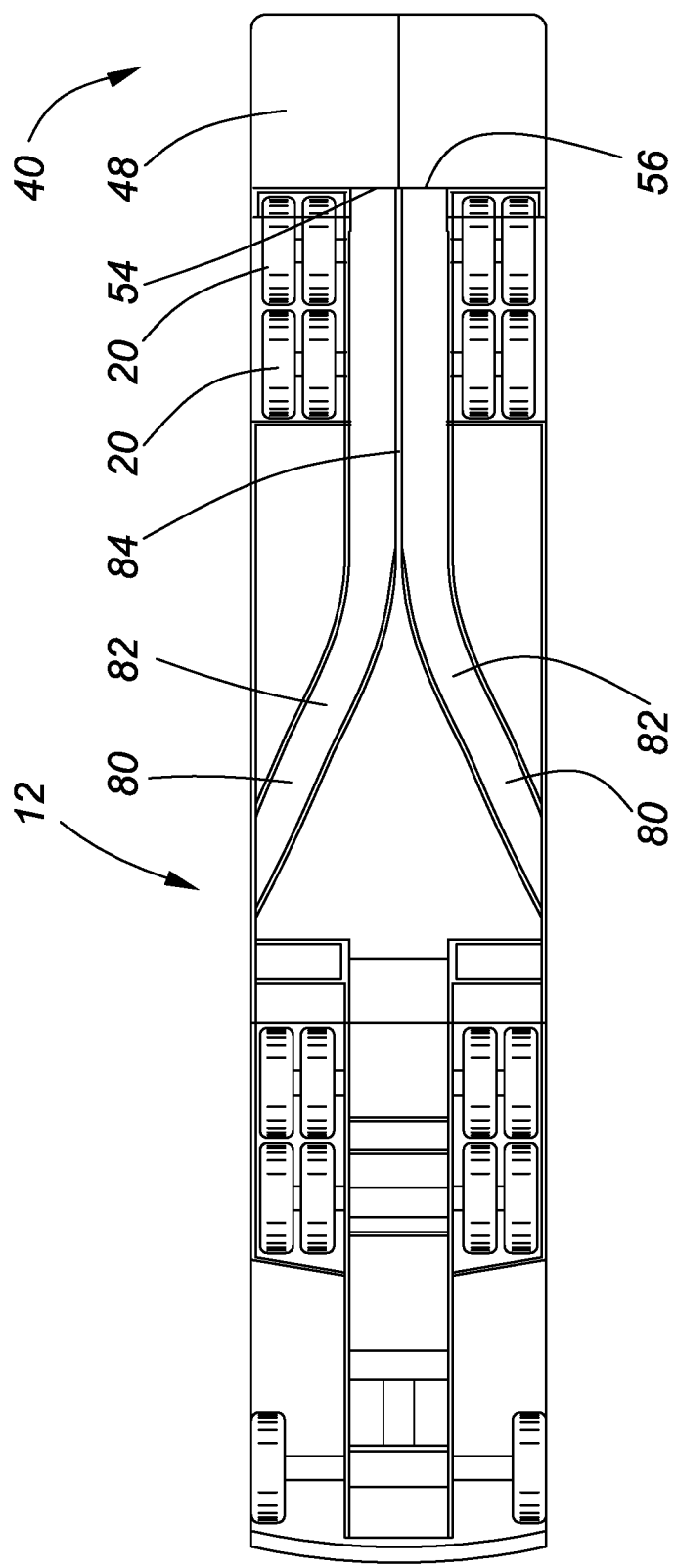
FIG. 11 is a bottom view of the vehicle of FIG. 1 wherein the floorpan has been removed.

Turning to FIGS. 10 and 11, a lower view of trailer 12 is illustrated wherein the floorpan has been removed. In this embodiment, the at least one inlet orifice is two inlet orifices 80 that are positioned in the side skirt walls 70. A convergence section that includes a first branch 82 and second branch 82 is provided that fluidly communicates with a main duct 84. Each branch 82 fluidly communicates with a corresponding inlet orifice 80. Main duct 84 fluidly communicates with each branch 82 and, in this embodiment, outlet 56 of main duct 84. In this embodiment, tailcone assembly 40 further includes a tailcone inlet orifice 54 that fluidly communicates with outlet 56 of main duct 84. It is contemplated that wheelset 20 is fluidly isolated from main duct by any known means that will appreciated by the skilled person in order to maintain the ability for main duct to conduct fluid from the inlet orifice to the outlet orifice. As discussed herein, it is further contemplated that main duct 84 can be comprised of a first longitudinal duct that fluidly communicates with first branch 82 (and a corresponding inlet) and a second longitudinal duct that fluidly communicates with second branch 82. In these embodiments, it is contemplated that the first longitudinal duct is separate from and does not fluidly communicate with the second longitudinal duct, and each longitudinal duct has a corresponding outlet that fluidly communicates with tailcone assembly 40.

Figure 12:
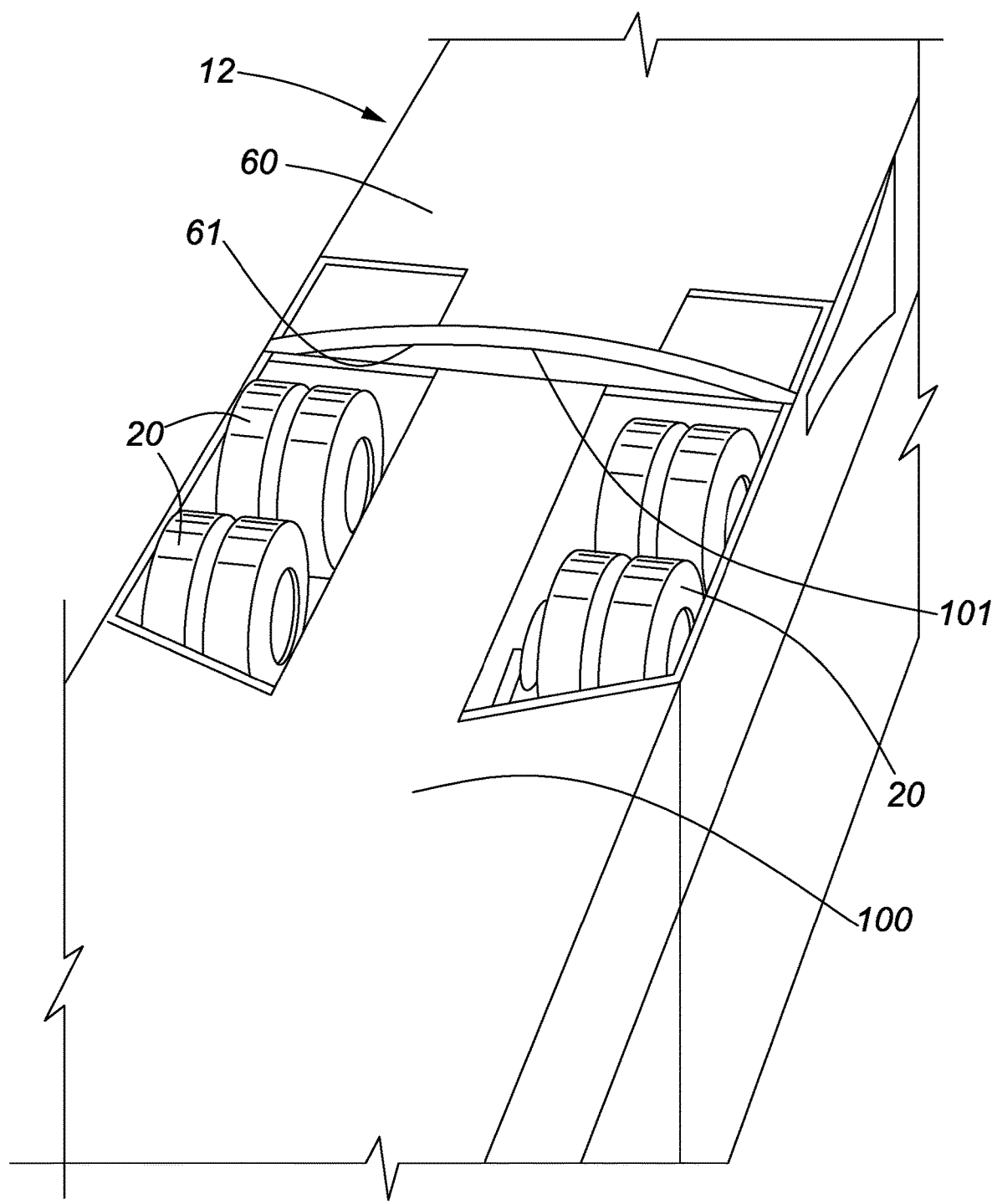
FIG. 12 is a bottom view of another vehicle in accordance with another embodiment of the present invention wherein the floorpan is in place.

Turning to FIG. 12, a lower view of another embodiment of trailer 12 is illustrated. In this embodiment, a longitudinally extending floorpan 60 is provided that extends from a position that longitudinally and rearwardly removed from the front end of the trailer 12 to a position that is adjacent to the rear end of trailer 12 and which substantially extends laterally between at least a portion of a lower edge of the first side skirt wall and at least a portion of a lower edge of the second side skirt wall.

Floorpan 60 substantially encloses the bottom surface of trailer 12 in order to encourage laminar flow about the lower surfaces of the trailer 12. In this embodiment, a curved front edge 61 of floorpan 60 is provided which cooperates with a curved rear edge 101 of a floorpan 100 provided on the tractor. In this way, it is contemplated that the tractor and trailer can articulate relative to one another in a smooth manner, as discussed herein.

Figure 13:
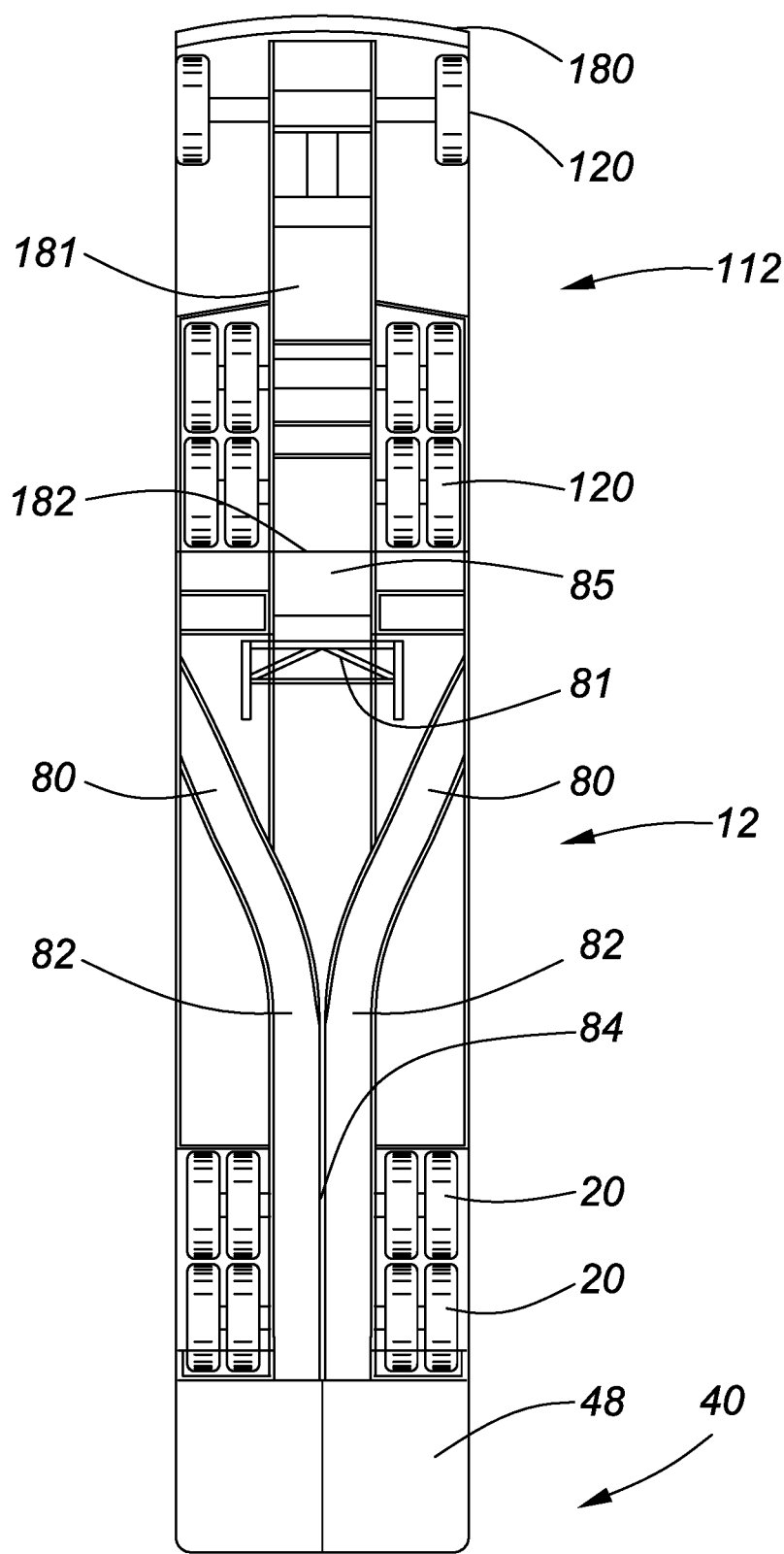
FIG. 13 is a bottom view of another vehicle in accordance with another embodiment of the present invention wherein the floorpan has been removed.

Turning to FIG. 13, a lower view of yet another embodiment of trailer 12 is illustrated. In this embodiment, trailer 12 is towed by a cooperating tractor 112. In this embodiment, the at least one inlet orifice is a pair of side surface inlet orifices 80 and a front surface inlet orifice 85. Main duct includes a central forward duct portion 81 that fluidly communicates with front surface inlet orifice 85, a convergence section having a first branch 82 and a second branch 82 and which each fluidly communicates with a respective side surface inlet orifice 80, and a rear central duct portion 84 that fluidly communicates with the convergence section, the central forward duct portion 81 and the outlet orifice 44 of the tailcone assembly 40. Tailcone assembly 40 also has a lower plate 48 to encourage laminar flow underneath the trailer 112.

Moreover, in this embodiment it is contemplated that tractor 112 has a front inlet orifice 180 that fluidly communicates with a main tractor duct 181 and a rear outlet orifice 182. It is further contemplated that rear outlet orifice 182 is adapted to align and fluidly communicate with front surface inlet orifice 85. It is also contemplated that tractor 112 has accompanying wheelsets 120, as will be appreciated by the skilled person.

In this way, it is contemplated that during forward movement of the vehicle, atmospheric air will be diverted into at least one inlet orifice and through main duct of the present invention where it will be subsequently channeled through an internal cavity of the tailcone assembly by way of flow directing vanes in order to be exhausted out the at least one outlet orifice. In this way, it is contemplated that the air pressure differential between the high pressure at the front and sides of the moving vehicle and the low pressure at the rear of the moving vehicle is reduced, thereby improving the laminar flow about the vehicle.

In a co-operative manner, a floorpan, downwardly projecting side skirt walls, a gap-filling assembly and an optional lower plate serve to generate a smoother form factor and reduce the overall surface roughness of the vehicle, thereby also improving the laminar flow about the vehicle. As a result, it is contemplated that the present invention provides a number of improvements that can be added to an existing vehicle (or, alternatively, a new vehicle) in order to reduce the overall frictional losses experienced by the vehicle in the interests of improving the resulting fuel efficiency of the vehicle.

The embodiments described herein are intended to be illustrative of the present compositions and methods and are not intended to limit the scope of the present invention. Various modifications and changes consistent with the description as a whole and which are readily apparent to the person of skill in the art are intended to be included. The appended claims should not be limited by the specific embodiments set forth in the examples but should be given the broadest interpretation consistent with the description as a whole.

What is claimed is:

1. A system for diverting airflow around a vehicle during forward motion comprising:
   at least one inlet orifice, the at least one inlet orifice located on at least one of a front surface, a side surface, a lower surface or a top surface of the vehicle;
   at least one duct, the at least one duct in fluid communication with the at least one inlet orifice, the at least one duct oriented substantially parallel to a longitudinal axis of the vehicle;
   at least one outlet orifice; and
   a tailcone assembly having a rearwardly facing, convexly projecting rounded surface, the tailcone assembly abutting a rear surface of the vehicle, the outlet orifice located on the rearwardly facing, convexly projecting rounded surface, the tailcone assembly defining an internal cavity, the at least one internal cavity in fluid communication with the at least one outlet orifice and the at least one duct.

2. The system of claim 1 wherein the internal cavity of the tailcone assembly further comprises at least one flow directing vane, the at least one flow directing vane adapted to encourage laminar flow within the internal cavity to the at least one outlet orifice.

3. The system of claim 1 wherein the tailcone assembly further comprises a forwardly facing mounting surface opposed from the rearwardly facing, convexly projecting rounded surface, the forwardly facing mounting surface abutting the rear surface of the vehicle.

4. The system of claim 3 wherein the forwardly facing mounting surface further comprises at least one edge, the at least one edge further comprising hinging means adapted to secure the tailcone assembly to the rear surface of the vehicle in a hinged manner such that the tailcone assembly can be moved between a first position and a second position.

5. The system of claim 1 wherein the internal cavity of the tailcone assembly has at least one tailcone inlet orifice, the tailcone inlet orifice in communication with the at least one duct.

6. The system of claim 1 wherein the vehicle is a trailer having a lower surface having a front end, a rear end, a first longitudinal side and a second longitudinal side, the trailer further comprising a first downwardly projecting side wall extending downwardly from the first longitudinal side between adjacent to the front end of the lower surface and adjacent to the second end of the lower surface and a second downwardly projecting side wall extending downwardly from the second longitudinal side between adjacent to the front end of the lower surface and adjacent to the second end of the lower surface.

7. The system of claim 6 wherein the trailer further comprises at least one wheelset mounted to the lower surface, the wheel set enclosed by the first downwardly projecting side wall and the second downwardly projecting side wall.

8. The system of claim 5 wherein the trailer has a planar trailer floor abutting and opposing the lower surface, the at least one duct positioned adjacent to the lower surface.

9. The system of claim 6 wherein the at least one inlet orifice is a first inlet orifice and a second inlet orifice and wherein the at least one duct further comprises a convergence portion in fluid communication with a central duct portion, the convergence portion having a first duct branch in fluid communication with the first inlet orifice and a second duct branch in fluid communication with the second inlet orifice, the central duct portion in fluid communication with the internal cavity of the tailcone assembly.

10. The system of claim 6 wherein the at least one inlet orifice is a first inlet orifice and a second inlet orifice and wherein the at least one duct further comprises a a first longitudinal duct and a second longitudinal duct, the first longitudinal duct fluidly isolated from the second longitudinal duct, the first longitudinal duct in fluid communication with the first inlet orifice and the second longitudinal duct in fluid communication with the second inlet orifice, the first longitudinal duct and the second longitudinal duct in fluid communication with the internal cavity of the tailcone assembly.

11. The system of claim 6 wherein the at least one inlet orifice is located on at least one of the first downwardly projecting side wall and the second downwardly projecting side wall.

12. The system of claim 6 wherein the trailer further comprises a longitudinally extending lower floorpan adapted for enclosing the lower surface of the trailer in a streamlined manner, the longitudinally extending lower floorpan extending laterally from a longitudinally extending lower edge of the first downwardly projecting side wall to a longitudinally extending lower edge of the second downwardly projecting side wall.

13. The system of claim 1 wherein the tailcone assembly is further comprised of impact-absorbing material.

14. The system of claim 1 wherein the vehicle is a trailer having a front surface, the trailer having forwardly projecting gap-filling means mounted to a front surface of the trailer.

15. The system of claim 1 wherein the at least one inlet orifice is a NACA inlet.

16. A trailer comprising:
at least one inlet orifice, the at least one inlet orifice located on at least one of a front surface, a side surface, a lower surface or a top surface of the trailer;
At least one duct, the at least one duct in fluid communication with the at least one inlet orifice, the at least one duct oriented substantially parallel to a longitudinal axis of the trailer;
at least one outlet orifice; and
a tailcone assembly having a rearwardly facing, convexly projecting rounded surface, the tailcone assembly abutting a rear surface of the trailer, the outlet orifice located on the rearwardly facing, convexly projecting rounded surface, the tailcone assembly defining an internal cavity, the at least one internal cavity in fluid communication with the at least one outlet orifice and the at least one duct.

17. The trailer of claim 16 wherein the internal cavity of the tailcone assembly further comprises a series of flow directing vanes, the flow directing vanes adapted to encourage laminar flow within the internal cavity to the at least one outlet orifice.

18. The trailer of claim 16, wherein the tailcone assembly further comprises a forwardly facing mounting surface opposed from the rearwardly facing, convexly projecting rounded surface, the forwardly facing mounting surface of the tailcone abutting the rear surface of the trailer.

19. The trailer of claim 18 wherein the forwardly facing mounting surface of the tailcone further comprises at least one edge, the at least one edge further comprising hinging means adapted to secure the tailcone assembly to the rear surface of the trailer in a hinged manner such that the tailcone assembly can be moved between a first position and a second position.

20. The trailer of claim 16 wherein the internal cavity of the tailcone assembly has at least one inlet orifice, the inlet orifice in communication with the at least one duct.

21. The trailer of claim 16 wherein the trailer further comprises a lower surface having a front end, a rear end, a first longitudinal side and a second longitudinal side, and a first downwardly projecting side wall extending downwardly from the first longitudinal side between a position longitudinally and rearwardly removed from the front end of the lower surface and adjacent to the second end of the lower surface and a second downwardly projecting side wall extending downwardly from the second longitudinal side between a position longitudinally and rearwardly removed from the front end of the lower surface and adjacent to the second end of the lower surface.

22. The trailer of claim 21, wherein the trailer further comprises at least one wheelset mounted to the lower surface, the wheel set enclosed by the first downwardly projecting side wall and the second downwardly projecting side wall.

23. The trailer of claim 16 wherein the trailer has a planar trailer floor opposing and abutting the lower surface, the at least one duct positioned adjacent to a lower surface of the trailer floor.

24. The trailer of claim 16 wherein the at least one inlet orifice is a first inlet orifice and a second inlet orifice and wherein the at least one duct further comprises a convergence portion in fluid communication with a central duct portion, the convergence portion having a first duct branch in fluid communication with the first inlet orifice and a second duct branch in fluid communication with the second inlet orifice, the central duct portion in fluid communication with the internal cavity of the tailcone assembly.

25. The trailer of claim 21 wherein the at least one inlet orifice is located on at least one of the first downwardly projecting side wall and the second downwardly projecting side wall.

26. The trailer of claim 21 wherein the at least one inlet orifice is located on the lower surface of the trailer.

27. The trailer of claim 21 wherein the trailer comprises a longitudinally extending lower floorpan adapted for enclosing the lower surface of the trailer in a streamlined manner, the longitudinally extending lower floorpan extending laterally from a longitudinally extending lower edge of the first downwardly projecting side wall to a longitudinally extending lower edge of the second downwardly projecting side wall, the longitudinally extending lower floorpan extending longitudinally from front edges of the first downwardly projecting side wall and the second downwardly projecting side wall to rear edges of the first downwardly projecting side wall and the second downwardly projecting side wall.

28. The trailer of claim 16 wherein the at least one inlet orifice is a NACA inlet.

29. The trailer of claim 16 wherein the tailcone assembly is further comprised of impact-absorbing material.

30. The trailer of claim 16 further comprising a tractor adapted for towing the trailer, the tractor having a front inlet orifice, a central main duct and a rear outlet orifice such that the rear outlet orifice fluidly communicates with at least one of the at least one inlet orifice of the trailer.

\* \* \* \* \*